US007302450B2

(12) United States Patent
Benedetti et al.

(10) Patent No.: US 7,302,450 B2
(45) Date of Patent: Nov. 27, 2007

(54) WORKLOAD SCHEDULER WITH RESOURCE OPTIMIZATION FACTORING

(75) Inventors: Fabio Benedetti, Rome (IT); Pietro Iannucci, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/876,021

(22) Filed: Jun. 24, 2004

(65) Prior Publication Data

US 2005/0076043 A1    Apr. 7, 2005

(30) Foreign Application Priority Data

Oct. 2, 2003    (EP) .................................. 03368092

(51) Int. Cl.
*G06F 7/00*    (2006.01)
(52) U.S. Cl. ................... 707/104.1; 707/100; 709/201; 718/102; 710/61
(58) Field of Classification Search ................ 707/2, 707/100, 104.1; 709/102; 718/102; 710/61
See application file for complete search history.

(56) References Cited

U.S. PATENT DOCUMENTS

| 6,353,844 B1* | 3/2002 | Bitar et al. ................ 718/102 |
| 6,574,605 B1* | 6/2003 | Sanders et al. ................ 705/8 |
| 6,591,262 B1* | 7/2003 | MacLellan et al. ............ 707/2 |
| 6,944,862 B2* | 9/2005 | Caggese et al. ............ 718/102 |
| 2003/0065835 A1* | 4/2003 | Maergner et al. ............ 710/61 |

OTHER PUBLICATIONS

Nieh et al., The Design, Implementation and Evaluation of SMART: A Scheduler for Multimedia Applications, Oct. 1997, ACM, vol. 31, Issue 5, pp. 184-197.*
Hindi S. K., Solving the CLSP by a Tabu Search Heuristic, Jan. 1996, Journal of the Operational Research Society, www.jstor.org, vol. 47, No. 1, pp. 151-161.*

* cited by examiner

*Primary Examiner*—Apu Mofiz
*Assistant Examiner*—Jessica N Le
(74) *Attorney, Agent, or Firm*—Francis Lammes; Stephen J. Walder, Jr.; Jeffrey S. LaBaw

(57) ABSTRACT

A workload scheduler supporting an efficient distribution and balancing of the workload is proposed. The scheduler maintains (383-386) a profile for each job; the profile (build using statistics of previous executions of the job) defines an estimated usage of different resources of the system by the job. The scheduler tends to select (318-342) the jobs with complementary resource requirements (according to a combination of their attributes); this process can be carried out using either a heuristic approach (318-334) or an optimization approach (335-342). As a result, the jobs that will be submitted are very likely to consume different resources of the system; in this way, any contention for the different resources is strongly reduced.

10 Claims, 5 Drawing Sheets

WORKLOAD SCHEDULER WITH RESOURCE OPTIMIZATION FACTORING

TECHNICAL FIELD

The present invention relates to the data processing field, and more specifically to a scheduling method.

BACKGROUND ART

Scheduling methods are commonly used in a data processing system to control submission of different work units to be executed (for example, jobs in a batch processing). For this purpose, several types of workload schedulers have been proposed in the last years to automate the submission of large quantities of jobs. An example of scheduler is described in "End-to-End Scheduling with Tivoli Workload Scheduler 8.1" V. Gucer, S. Franke, F. Knudsen, M. A. Lowry—ISBN 0738425079.

A scheduler submits the jobs according to a predefined plan. The plan establishes a flow of execution of the jobs according to several factors; typically, the factors affecting the flow of execution include temporal values (such as date, time, day of the week) and dependencies (such as completion of predecessor jobs or system resource availability).

The schedulers known in the art are very sophisticated in handling temporal and predecessor constraints. However, a very basic support is available for managing the problems relating to the availability of the resources that are used by the different jobs. Typically, most schedulers are able to resolve simple dependencies, which condition the submission of the jobs to a particular resource or set of resources. Moreover, the schedulers help an operator select the jobs to be submitted whenever their number exceeds a maximum allowable value (limiting the number of jobs that are running concurrently to avoid excessive contention for the resources of the system). For example, the operator can assign a weight to each job (representing a supposed impact of the job on the system performance); those weights are used by the scheduler to assign different priorities to the jobs to be submitted.

A drawback of the solutions described above is the lack of any efficient support for distributing and balancing a workload of the system. Indeed, the weights assigned to the jobs by the operator are very inaccurate in nature; moreover, those weights do not take into account a history of the different jobs. In any case, the proposed approach is unable to prevent overloading specific resources of the system (for example, when more jobs very intensive on that resource are submitted at the same time).

Document U.S. Pat. No. 6,591,262 discloses a system wherein the scheduler collaborates with a workload manager. The workload manager is a software component (included is an operating system), which manages the resources that are allocated to the different running jobs. In the proposed system, the scheduler maintains a profile for each job; the profile (build using statistics of previous executions of the job) defines an estimated usage of different resources of the system by the job. Whenever the job is submitted for execution, the corresponding profile is attached and passed to the workload manager. In this way, the workload manager can optimize the allocation of the resources of the system to the different running jobs.

However, the solution described in the cited document only acts on the jobs that are already in execution. Therefore, the proposed technique is unable to prevent the submission of potentially competing jobs. In any case, the advantageous effects of the devised collaborative scheme can only be achieved in systems wherein the operating system includes a workload manager, which has been adapted to receive the profiles from the scheduler.

SUMMARY OF THE INVENTION

It is an object of the present invention to provide a scheduling method, which supports an efficient distribution and balancing of the workload of the system.

It is another object of the present invention to improve the usage of the different resources, in order to increase the throughput of the system.

It is yet another object of the present invention to avoid overloading specific resources of the system.

Moreover, it is an object of the present invention to prevent the submission of potentially competing jobs.

It is another object of the present invention to minimize resource contention by the jobs.

It is yet another object of the present invention to improve the distribution and balancing of the workload in systems without any workload manager (or with a workload manager that is unable to receive the profiles from the scheduler).

The accomplishment of these and other related objects is achieved by a method of scheduling submission of work units for execution on a data processing system, the method including the steps of: providing a plurality of attributes for each work unit, each attribute being indicative of the usage of a corresponding resource of the system by the work unit, selecting a subset of the work units for optimizing the usage of each resource individually according to a corresponding combination of the attributes, and submitting the selected work units.

The present invention also provides a computer program for performing the method and a product storing the program. A corresponding structure for implementing the method is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
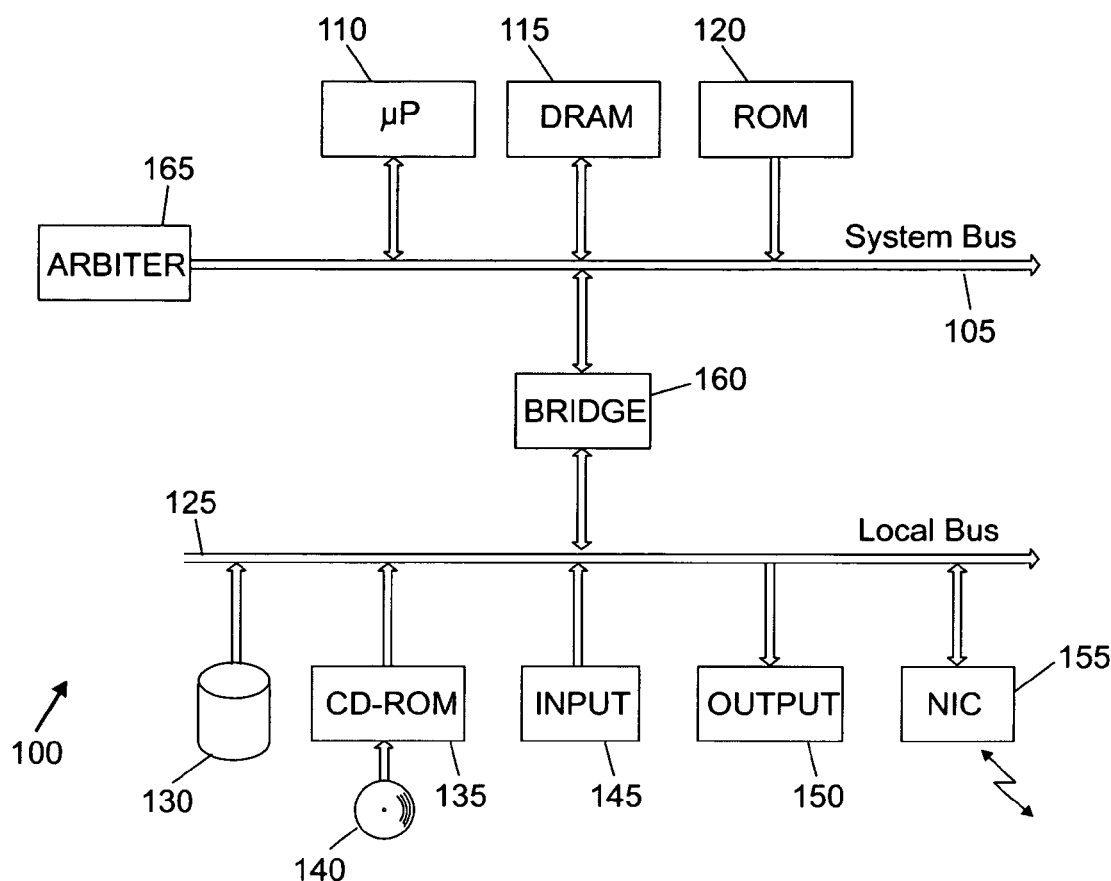
FIG. 1 is a schematic block diagram of a computer in which the method of the invention is applicable.

With reference in particular to FIG. 1, a schematic block diagram of a computer 100 (for example, a main frame) is shown. The computer 100 is formed by several units, which are connected in parallel to a system bus 105. In detail, multiple microprocessors (µP) 110 control operation of the computer 100; a DRAM 115 (typically consisting of interleaved modules) is directly used as a shared working memory by the microprocessors 110, and a ROM 120 stores basic code for a bootstrap of the computer 100. Several peripheral units are clustered around a local bus 125 (by means of respective interfaces). Particularly, a mass memory consists of a hard-disk 130 and a driver 135 for reading CD-ROMs 140. Moreover, the computer 100 includes input devices 145 (for example, a keyboard and a mouse), and output devices 150 (for example, a monitor and a printer). A network Interface Card (NIC) 155 is used to connect the computer 100 to a network. A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

Similar considerations apply if the computer has a different structure (for example, with a single bus) or includes other units (for example, drivers for magnetic tapes). However, the concepts of the present invention are also applicable when the computer consists of a mini-system, or when the computer is replaced with an equivalent data processing system (such as a network of workstations).

Figure 2:
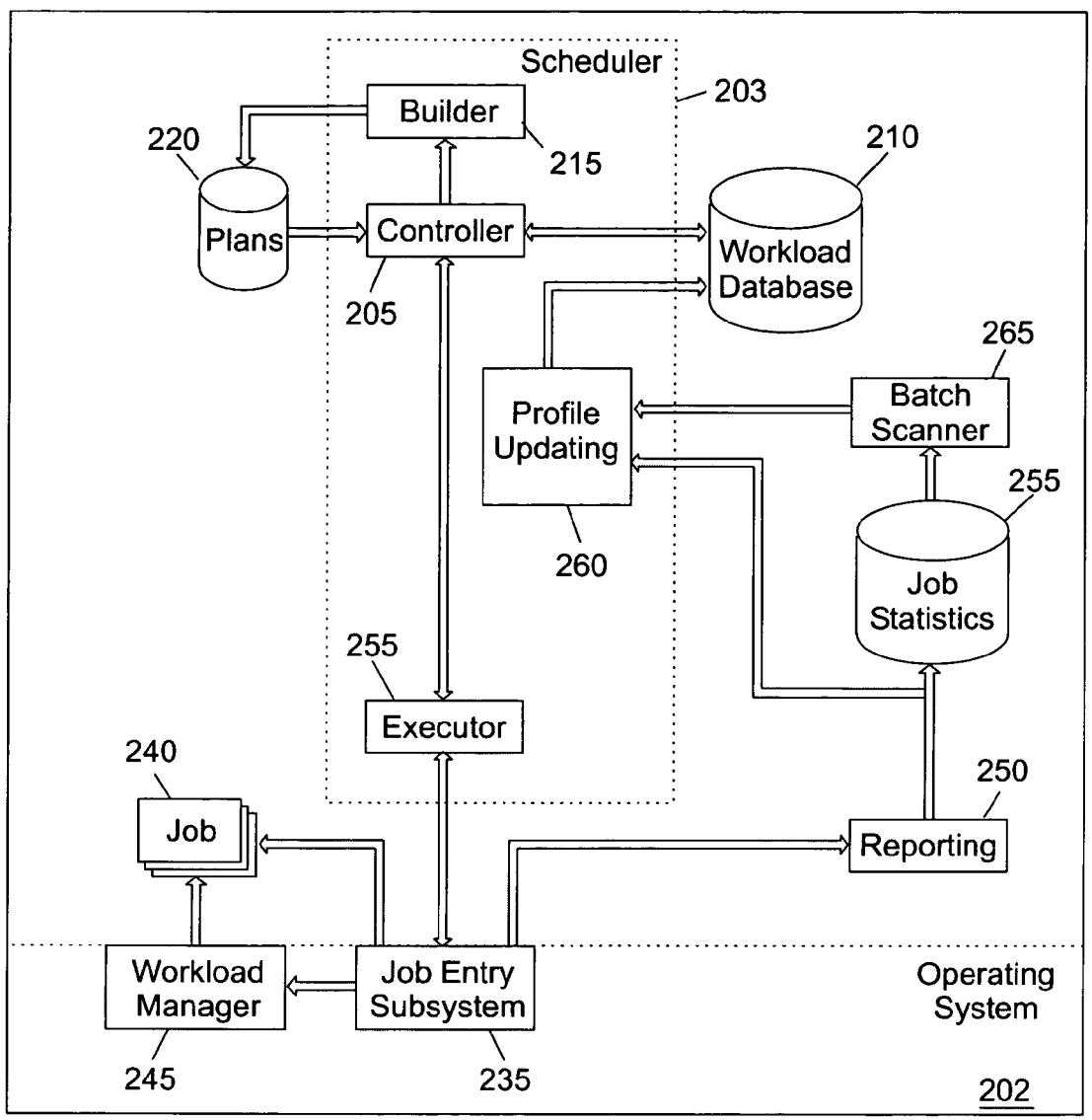
FIG. 2 depicts the main software components that can be used for practicing the method.

Moving to FIG. 2, the main software components that can be used to practice the method of the invention are depicted. The information (programs and data) is typically stored on the hard-disk and loaded (at least partially) into the working memory of the computer when the programs are running, together with an operating system and other application programs (not shown in the figure). The programs are initially installed onto the hard disk from CD-ROM.

An operating system 202 provides a software platform for the above-described computer, on top of which other programs can run. Particularly, a workload scheduler 203 is installed on the computer. The scheduler 203 includes a controller 205 for managing execution of a series of non-interactive jobs (typically during the evening); for example, the jobs consist of payroll programs, cost analysis applications, and the like. The controller 205 accesses a workload database 210, which stores information about the different jobs to be executed. For each job, the workload database 215 includes a description of the corresponding steps, a planned time of execution, and any dependency from other jobs or resources of the system; moreover, the workload database 210 stores a record indicating an estimated duration of the job.

A profile is also associated with each job in the workload database 210 (or at least with the ones that are run regularly). The profile includes multiple attributes of the job; each attribute is indicative of the usage of a corresponding resource of the computer, which is likely to be required by the job during its execution. Preferably, an attribute of the profile represents an estimated processing power consumption. A different attribute indicates an estimated (working) memory requirement. A further attribute specifies an estimated input/output activity. Typically, the different attributes are expressed as percentage values. The controller 205 transmits the description of each job to be executed (stored in the workload database 210) to a builder 215. The builder 215 creates plans 220 for controlling a flow of execution of batches of jobs in a determined sequence; each plan 220 is built according to a desired scheduling strategy (for example, to balance a load of the computer or to optimize its peak performance). The plan 220 is supplied, through the controller 205, to an executor 225.

As described in detail in the following, the executor 225 selects the jobs to be run according to the plan 220; the selected jobs are then submitted for execution to the operating system 202. The jobs are received by the operating system 202 via a job entry subsystem 235. The job entry subsystem 235 controls the running of a current instance of each submitted job (denoted with 240). Moreover, the job entry subsystem 235 interfaces with a workload manager 245 (included in the operating system 202 as well). The workload manager 245 monitors the running jobs 240; the workload manager 245 allocates the appropriate resources of the computer to the different running jobs 240, in order to optimize load balancing and overall performance.

Once the current instance of a generic job terminates its execution (because all the operations have been completed or an error has occurred), feedback information is returned to the controller 205 via the executor 225; the feedback information includes an actual start time and an actual end time of the terminated instance of the job, a return code specifying the result of the operations, and the like. The controller 205 uses this information to calculate a duration of the terminated job, in order to predict how long the job should run in the future; the corresponding record indicating the estimated duration of the job is updated accordingly in the workload database 210.

At the same time, a reporting module 250 collects statistics about the terminated job; for example, the statistics include the consumption of processing power (expressed in microprocessor time units, such as seconds), the memory usage (expressed in number of bytes), the input/output activity (expressed in number of performed operations), and the like. The information collected by the reporting module 250 is logged into a job statistics database 255. A profile updating module 260 captures the statistics of the terminated job (before they are written to the database 255). The module 260 uses these statistics to update the corresponding profile of the job in the workload database 210. In addition or in alternative, a batch scanner 265 periodically imports all the statistics (of the instances of the jobs that have been previously executed) from the database 255. The profile updating module 260 uses these statistics for performing a bulk update of the profiles in the workload database 210 on a regular basis (for example, every day).

Similar considerations apply if the programs and the corresponding data are structured in another way, if different modules or functions are supported, or if the programs are provided on equivalent computer readable medium (such as one or more floppy-disks). Alternatively, the jobs are described in a different way in the workload database, the attributes are expressed with equivalent values, or the profiles of the jobs include other information; likewise, the scheduler receives equivalent feedback information for each terminated job, the statistics are collected in a different way, or the job statistics database includes other information (for example, the number of consumed service units, defined as an intelligent mix of various factors). In any case, the concepts of the present invention are also applicable when the profiles are used by the workload manager to adjust the distribution of the resources that are allocated to the running jobs, or even when the operating system does not include any workload manager. Moreover, the invention is also suitable to be used for scheduling submission of different jobs, interactive tasks, or more generally any other work unit.

Figure 3A:
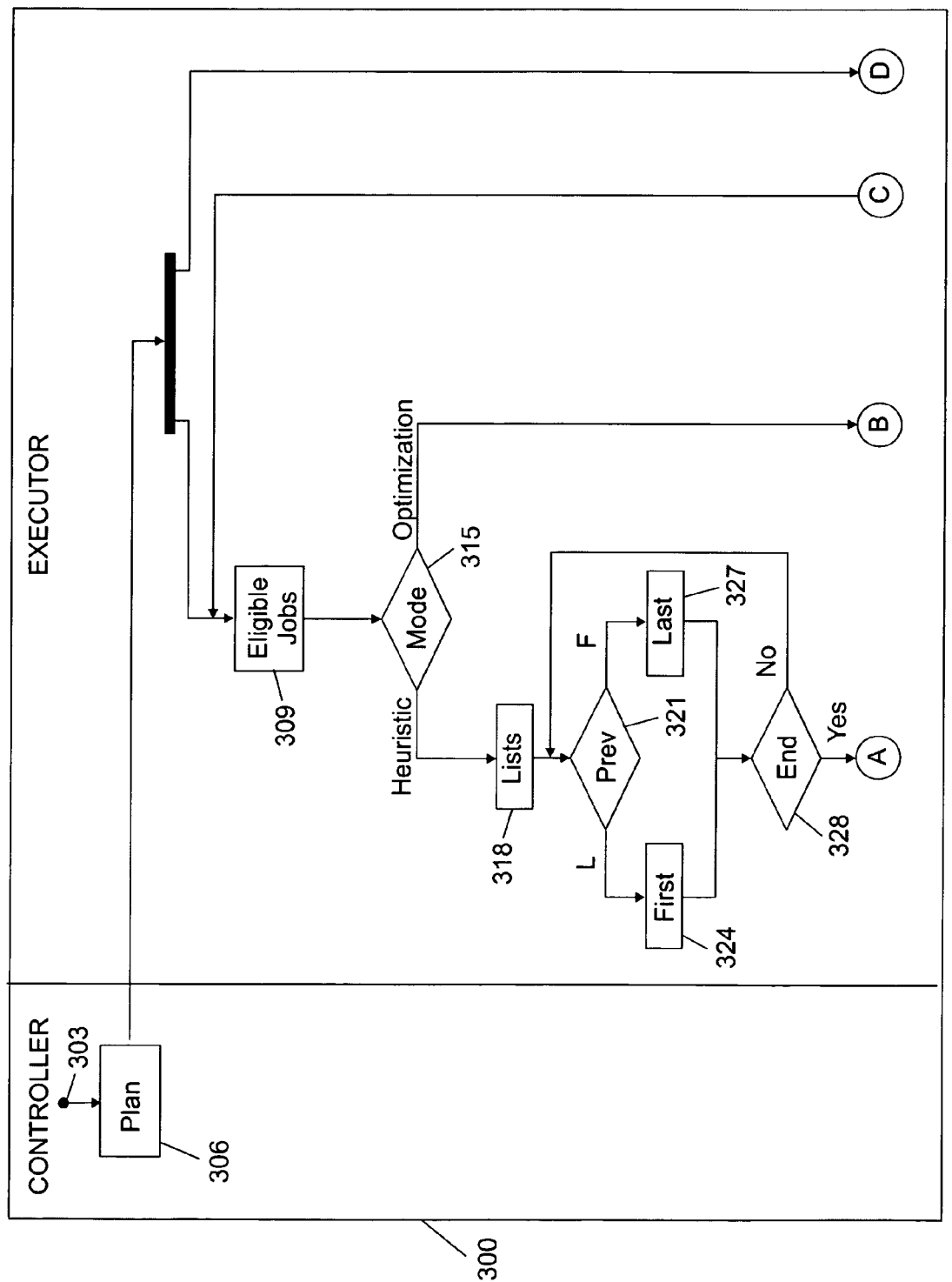
FIGS. 3*a*-3*c* show a diagram describing the flow of activities relating to an illustrative implementation of the method.
Figure 3B:
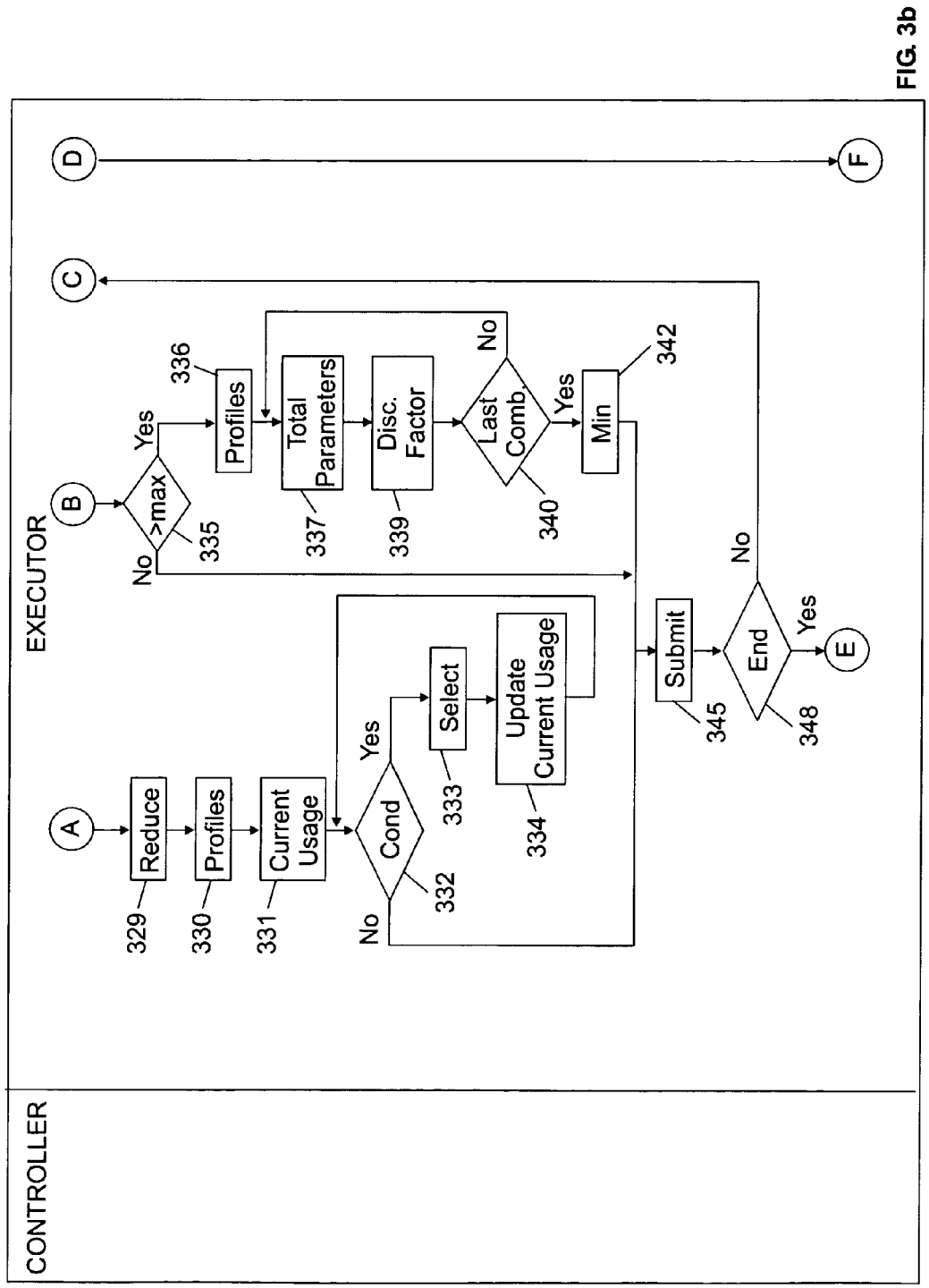
Figure 3C:
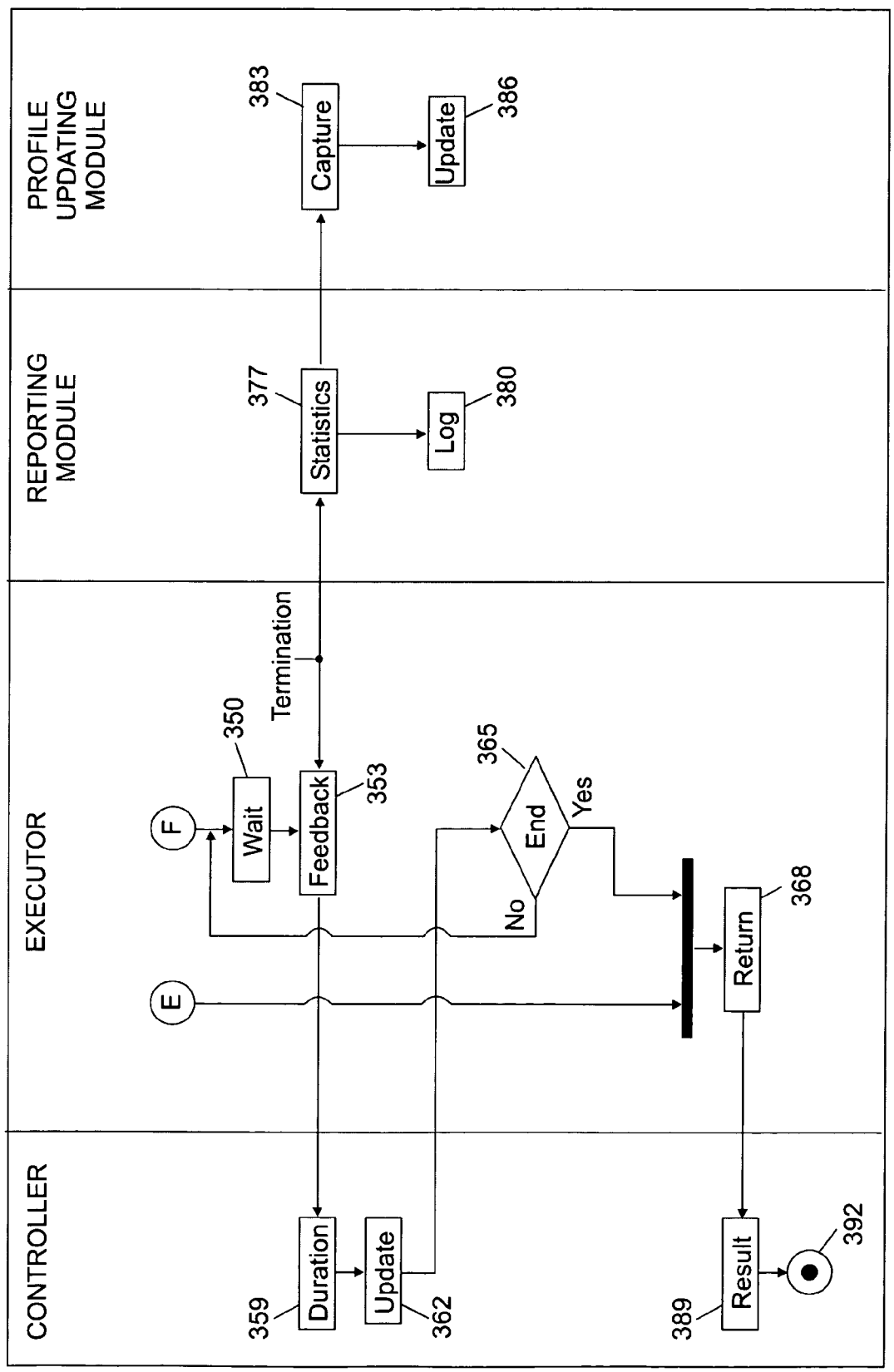

With reference now to FIGS. 3a-3c, the scheduler (when running on the computer) performs a method 300 that begins at the black start circle 303 in the swim-lane of the controller. Continuing to block 306, a desired plan (for example, selected by an operator through a graphical user interface of the scheduler) is submitted to the executor.

The swim-lane of the executor includes two branches that are executed in parallel. A first branch consists of blocks 309-348, and a second branch consists of blocks 350-365; the two branches joint at block 368.

Considering in particular the branch 309-348, the executor at block 309 identifies the jobs that are eligible for submission (according to their planned time of execution and their dependencies). The process then branches at block 315 according to the mode of operation of the scheduler. If the scheduler is configured to operate in a heuristic mode the blocks 318-334 are executed, while if the scheduler is configured to operate in an optimization mode the blocks 335-342 are executed; in both cases, the flow of activity merges again at block 345.

When the scheduler operates in the heuristic mode (blocks 318-334), the executor at block 318 creates a list for each attribute taken into consideration (processing-usage, memory-usage and I/O-usage, respectively); each list orders the eligible jobs according to the corresponding attributes (for example, in a decreasing order from the most resource-consuming job to the less resource-consuming job). A loop 321-328 is then entered for establishing a priority order of the eligible jobs; for this purpose, a preference sequence is built alternately extracting the first jobs and the last jobs, respectively, from the above-described lists. Particularly, if the eligible jobs have been extracted from the end of the lists during a previous iteration of the loop (decision block 321), the first eligible jobs of the lists are selected and inserted into the preference sequence at block 324 (the same operation is also executed at a first iteration of the loop); conversely, if the eligible jobs have been extracted from the beginning of the lists during the previous iteration of the loop, the last eligible jobs of the lists are selected and inserted into the preference sequence at block 327. In both cases, the method then verifies at block 328 whether all the eligible jobs have been extracted from the lists. If not, the flow of activity returns to block 321 for repeating the operations described above. Conversely, the loop ends and the preference sequence so obtained is reduced at block 329, removing any duplication of the available jobs after their first occurrences.

The process continues to block 330, wherein the executor retrieves the profiles of the running jobs and the eligible jobs from the workload database. For each resource taken into consideration (processing power, working memory and input/output activity), a current usage is estimated at block 331 summing the corresponding attributes of all the running jobs. A test is then made at block 332 to verify whether a predefined threshold condition is still met should the first eligible job (in the preference sequence) be submitted; for example, the threshold condition specifies a maximum allowable processing-usage, a maximum allowable memory-usage and a maximum allowable I/O-usage. If so (i.e., whether the current usage of each resource with the addition of the corresponding attribute of the first eligible job does not exceed its maximum usage), the first eligible job is selected and removed from the preference sequence at block 333. The process continues to block 334, wherein the current processing-usage, the current memory-usage and the current I/O-usage are updated accordingly (adding the corresponding attributes of the selected eligible job). The flow of activity then descends into block 345; the same block is reached from block 332 directly when the threshold condition is not met or the preference sequence is empty (since all the eligible jobs have been selected).

On the other hand, when the scheduler operates in the optimization mode (blocks 335-342), a test is made at block 335 to determine whether the number of eligible jobs exceeds a maximum allowable value; the maximum value is defined so as to limit the number of jobs that are running concurrently (thereby avoiding excessive contention for the resources of the computer). If so, the blocks 336-342 are executed, and the process then continues to block 345; conversely, the flow of activity descends into block 345 directly.

Considering now block 336 (number of eligible jobs higher than the maximum value), the executor retrieves the profiles of the eligible jobs from the workload database. An objective function modeling a distribution of the usage of the different resources is defined; the combination of the attributes of the eligible jobs that optimizes the objective function (among all the possible combinations) is then selected. In detail, for each combination (starting from a first one) the executor at block 337 calculates a parameter representing a total usage of each resource (by summing the corresponding attributes of all the eligible jobs of the combination). The process continues to block 339, wherein a discontinuance factor is determined summing the differences (in absolute value) between each pair of those total resource-usage parameters. A test is then made at block 340 to verify whether a last combination has been processed. If not, the method returns to block 337 for repeating the same operations for a next combination. Conversely, the eligible jobs of the combination that exhibits the lowest discontinuance factor are selected at block 342.

Considering now block 345, the selected jobs are submitted for execution. The executor then verifies at block 348 whether all the jobs of the plan have been submitted. If not, the flow of activity returns to block 309 for repeating the operations described above on the jobs of the plan still to be submitted. Conversely, the execution of the branch ends at block 368.

At the same time, in the other branch 350-365 the executor is in a waiting condition at block 350. As soon as a generic job terminates its execution, the corresponding feedback information is returned to the controller at block 353. In response thereto, the controller at block 359 calculates the duration of the terminated job by subtracting its start time from its end time. Continuing to block 362, the controller uses the value so calculated to update the estimated duration of the job; for example, the estimated duration is determined as a running average of the values that have been measured for completed instances of the job (preferably filtering very different values as anomalies).

Returning to the swim-lane of the executor, a test is made at block 365 to determine whether all the jobs of the plan have been terminated. If not, the flow of activity returns to block 350 waiting for the termination of a further job. Conversely, the execution of the branch ends at block 368.

Concurrently, the termination of the job also triggers the collection of the corresponding statistics by the reporting module at block 377. Proceeding to block 380, the collected information is logged into the job statistics database. The statistics are also captured by the profile updating module at block 383 (in the respective swim-lane). These statistics are then used at block 386 to update the profile of the job. For example, each attribute of the job is updated to a corresponding running average of the values that have been measured for completed instances of the job; preferably, the profile updating module can be tuned with user-adjustable parameters that define a smoothing factor and an anomaly identifying limit (which are used to discard very different values).

Referring back to the swim-lane of the executor, the two branches described above joint at block 368 and the flow of activity returns to the controller. In response thereto, the controller at block 389 logs a result of the execution of the plan. The process then ends at the concentric white/black stop circles 392.

For example, let us consider 5 eligible jobs $\{J_1, J_2, J_3, J_4, J_5\}$; the profile of each eligible job is defined by the processing-usage attribute (denoted with $P_i$, i=1 . . . 5), the memory-usage attribute (denoted with $M_i$) and the I/O-usage attribute (denoted with $I_i$):

$J_1=\{P_1=10, M_1=2, I_1=3\}$
$J_2=\{P_2=5, M_2=3, I_2=6\}$
$J_3=\{P_3=1, M_3=10, I_3=5\}$
$J_4=\{P_4=2, M_4=12, I_4=1\}$
$J_5=\{P_5=3, M_5=1, I_5=2\}$

When the scheduler operates in the heuristic mode, the lists for the processing-usage attributes, for the memory-usage attributes and for the I/O-usage attributes are:

Processing-usage list=$\{J_1=10, J_2=5, J_5=3, J_4=2, J_3=1\}$
Memory-usage list=$\{J_4=12, J_3=10, J_2=3, J_1=2, J_5=1\}$
I/O-usage list=$\{J_2=6, J_3=5, J_1=3, J_5=2, J_4=1\}$ As a consequence, the preference sequence is created as follows:

$\{J_1, J_4, J_2, J_3, J_5, J_4, J_2, J_3, J_3, J_4, J_1, J_2, J_5, J_2, J_3\}$ and is then reduced to:

$\{J_1, J_4, J_2, J_3, J_5\}$

The algorithm requires the executor to estimate a current usage of each resource (according to the attributes of the running jobs); for example, the current processing-usage (denoted with Cp) is 32, the current memory-usage (denoted with Cm) is 38 and the current I/O-usage (denoted with Ci) is 57. Let us assume that the threshold condition specifies that the processing-usage must be lower than 55, the memory-usage must be lower than 60 and the I/O-usage must be lower than 75:

(Cp<50) AND (Cm<60) AND (Ci<70)

In this situation, the threshold condition is still met if the first eligible job in the preference sequence ($J_1$) is submitted; indeed, the current usage of each resource with the addition of the corresponding attribute of the eligible job $J_1$ does not exceed the respective maximum usage:

$Cp=32+10=42<50$ $Cm=38+2=40<60$ $Ci=57+3=60<70$

Therefore, the eligible job $J_1$ is selected and removed from the preference sequence; at the same time, the current usage of each resource is updated adding the corresponding attribute of the selected job $J_1$ (Cp=42, Cm=40 and Ci=60). Likewise, the threshold condition is still met if the new first eligible job in the preference sequence ($J_4$) is submitted:

$Cp=42+2=44<55$ $Cm=40+12=52<60$ $Ci=60+1=61<75$

Therefore, the eligible job $J_4$ is selected and the current usage of each resource is updated accordingly (Cp=44, Cm=52 and Ci=61). The same operations are repeated for the next eligible job $J_2$ (with Cp=49, Cm=55 and Ci=67). In this situation, however, the threshold condition is not met any longer if the further eligible job ($J_3$) is submitted, since:

$Cp=49+1=50<55$ $Cm=55+10=65$ not $<60$ $Ci=67+5=72<75$

Therefore, the executor selects the eligible jobs $J_1$, $J_4$ and $J_2$ for execution.

The above-described algorithm combines the most resource-intensive jobs with the less resource-intensive jobs (for each resource); therefore, this method allows selecting the eligible jobs that use different resources with a good approximation. Preferably, the selection starts from the most resource-intensive jobs. In this way, each resource is allocated to the heavy jobs as far as possible; the less resource-intensive jobs can then be used to exploit any residual availability of the resources.

On the other hand, when the scheduler operates in the optimization mode, the possible combinations of the eligible jobs are $$\binom{5}{3} = \frac{5!}{3!(5-3)!} = 10,$$

that is:
$\{J_1, J_2, J_3\}$
$\{J_1, J_2, J_4\}$
$\{J_1, J_2, J_5\}$
$\{J_1, J_3, J_4\}$
$\{J_1, J_3, J_5\}$
$\{J_1, J_4, J_5\}$
$\{J_2, J_3, J_4\}$
$\{J_2, J_3, J_5\}$
$\{J_2, J_4, J_5\}$
$\{J_3, J_4, J_5\}$ For each combination $C_j$ (with j=1 . . . 10), the total processing-usage parameter (denoted with $Tp_j$), the total memory-usage parameter (denoted with $Tm_j$), and the total I/O-usage parameter (denoted with $Ti_j$) are defined by the following formulas (wherein each summation relates to the attributes of the corresponding eligible jobs):

$Tp_j = \Sigma P$
$Tm_j = \Sigma M$
$Ti_j = \Sigma I$

In the example at issue, we have:
$C_1=\{J_1, J_2, J_3\}$: $Tp_1=16$, $Tm_1=15$, $Ti_1=14$
$C_2=\{J_1, J_2, J_4\}$: $TP_2=17$, $Tm_2=17$, $Ti_2=10$
$C_3=\{J_1, J_2, J_5\}$: $Tp_3=18$, $Tm_3=6$, $Ti_3=11$
$C_4=\{J_1, J_3, J_4\}$: $Tp_4=13$, $Tm_4=24$, $Ti_4=9$
$C_5=\{J_1, J_3, J_5\}$: $Tp_5=14$, $Tm_5=13$, $Ti_5=10$
$C_6=\{J_1, J_4, J_5\}$: $Tp_6=15$, $Tm_6=15$, $Ti_6=6$
$C_7=\{J_2, J_3, J_4\}$: $Tp_7=8$, $Tm_7=25$, $Ti_7=12$
$C_8=\{J_2, J_3, J_5\}$: $Tp_8=9$, $Tm_8=14$, $Ti_8=13$
$C_9=\{J_2, J_4, J_5\}$: $Tp_9=10$, $Tm_9=16$, $Ti_9=9$
$C_{10}=\{J_3, J_4, J_5\}$: $Tp_{10}=6$, $Tm_{10}=23$, $Ti_{10}=8$ The discontinuance factor (denoted with $DF_j$) for each combination $C_j$ is obtained applying the formula:

$DF_j = |Tp_j - Tm_j| + |Tp_j - Ti_j| + |Tm_j - Ti_j|$

Therefore, we have:
$C_1=\{J_1, J_2, J_3\}$: $DF_1=4$
$C_2=\{J_1, J_2, J_4\}$: $DF_2=14$
$C_3=\{J_1, J_2, J_5\}$: $DF_3=24$ $C_4=\{J_1, J_3, J_4\}$: $DF_4=30$
$C_5=\{J_1, J_3, J_5\}$: $DF_5=8$
$C_6=\{J_1, J_4, J_5\}$: $DF_6=18$
$C_7=\{J_2, J_3, J_4\}$: $DF_7=34$
$C_8=\{J_2, J_3, J_5\}$: $DF_8=10$
$C_9=\{J_2, J_4, J_5\}$: $DF_9=14$
$C_{10}=\{J_3, J_4, J_{10}\}$: $DF_{10}=34$ The best combination of eligible jobs (identified by the minimum discontinuance factor $DF_1=4$) is then $C_1=\{J_1, J_2, J_3\}$.

In this case, the consumption of the resources of the computer is uniformly distributed (as far as possible) among the different resources.

In both modes of operations intelligence is added to the scheduler, which tends to select jobs with complementary resource requirements. As a result, the jobs that will be submitted are very likely to consume different resources of the system. For example, the scheduler can select a job that is very intensive on the processing power together with other jobs having low processing power requirements. In this way, the selected jobs should not compete for the processing power of the system. However, the jobs with low processing power requirements can be very intensive on other resources of the system (such as the memory). In this way, the overall performance of the system is strongly increased (since the usage of each resource is optimized individually).

Similar considerations apply if an equivalent method is performed, or if some functions are executed by different modules. In any case, the concepts of the present invention are also applicable when the profiles are determined by a module embedded in the scheduler itself, when the attributes of the jobs are updated applying other algorithms, or when the scheduler supports different modes of operations (down to a single one). Alternatively, the threshold condition is defined only taking into account some of the resources, the eligible jobs are selected preferring the less resource-intensive ones, or the maximum value is calculated dynamically.

More generally, the present invention proposes a method of scheduling submission of work units for execution on a data processing system. For this purpose, a plurality of attributes is provided for each work unit; each attribute is indicative of the usage of a corresponding resource of the system by the work unit. The method involves the selection of a subset of the work units for optimizing the usage of each resource individually (according to a corresponding combination of the attributes). The selected work units are then submitted.

The method of the invention provides an efficient distribution and balancing of the workload of the system.

In this way, the usage of the different resources is strongly improved, thereby increasing the throughput of the system.

The devised solution avoids overloading specific resources of the system.

The method of the invention makes it possible to prevent the submission of potentially competing jobs.

As a consequence, any resource contention (caused by the submitted jobs) is reduced.

The above-mentioned advantages can be experienced even in systems without any workload manager (or with a workload manager that is unable to receive the profiles from the scheduler); however, the use of the proposed solution in different environments is not excluded and within the scope of the present invention.

The preferred embodiment of the invention described above offers further advantages.

Particularly, the attributes for each job are estimated using statistics that have been measured for previous executions of the job.

In this way, the behavior of the next instances of the jobs can be predicted with a high degree of accuracy.

In a preferred implementation of the invention, the profile for each job includes an attribute indicative of the usage of the processing power of the system, another attribute indicative of the usage of the memory of the system and/or a further attribute indicative of the input/output activity of the job.

Simulation results have shown that the processing-usage attribute is the most important factor for optimizing the workload balancing of the system. The memory-usage attribute has proved to be very important as well for increasing the throughput of the system. Moreover, the I/O-usage attribute further improves the performance of the proposed method.

However, the solution according to the present invention leads itself to be implemented determining the profiles of the jobs in another way, and even with some attributes that are defined by the operator. Alternatively, the scheduler supports two or more different attributes (for example, an attribute for the usage of network facilities, attributes for the usage of specific I/O peripherals, and the like).

In a particular embodiment of the invention, the selection of the jobs is based on a heuristic approach.

This approach is not optimal, but the loss of precision in the distribution of the workload is more than compensated for by the computational simplicity.

As a further enhancement, the threshold condition is indicative of the maximum allowable usage of one or more resources of the system.

The proposed feature avoids an excessive contention for specific resources of the system.

Preferably, the eligible jobs are selected using the above-described algorithm.

This algorithm has proved to be very efficient in many practical situations.

A different implementation of the invention makes use of optimization techniques.

This solution ensures the best performance of the method (at the cost of an increased computational complexity).

A suggested choice for the objective function to be optimized consists of the above-described discontinuance factor.

The proposed algorithm is quite simple, but at the same time efficient.

In any case, the scheduler can use alternative algorithms when operating either in the heuristic mode or in the optimization mode. For example, in the heuristic mode the number of eligible jobs to be selected is predefined, or the threshold condition is defined in another way (for example, only taking into account the eligible jobs); on the other hand, in the optimization mode the discontinuance factor is calculated with a different formula, or another factor is minimized/maximized. However, the use of one or more different approaches is contemplated and within the scope of the invention.

Advantageously, the solution according to the present invention is implemented with a computer program, which is provided as a corresponding product stored on a suitable medium.

Alternatively, the program is pre-loaded onto the hard-disk, is sent to the computer through a network (typically the INTERNET), is broadcasted, or more generally is provided in any other form directly loadable into a working memory of the computer. However, the method according to the present invention leads itself to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims

The invention claimed is:

1. A method of scheduling submission of work units for execution on a data processing system, the method including the steps of:
providing a plurality of attributes for each work unit, each attribute being indicative of the usage of a corresponding resource of the system by the work unit, wherein the plurality of attributes for each work unit includes at least one of a first attribute indicative of a usage of a processing power, a second attribute indicative of a usage of a memory of the system, or a third attribute indicative of a usage of an input/output activity of the system;
selecting a subset of the work units for optimizing the usage of each resource individually according to a corresponding combination of the attributes; and
submitting the selected work units, wherein the step of selecting the subset of the work units includes:
defining an objective function indicative of a distribution of the usage of the resources of the system, wherein the step of defining the objective function includes, for each combination of the eligible work units:
calculating a total parameter for each resource by summing the attributes corresponding to the resource for each eligible work unit of the combination, and
calculating a discontinuance factor by summing the absolute value of the differences between each pair of total parameters.

2. The method according to claim 1, wherein the step of providing the plurality of attributes for each work unit includes:
measuring a plurality of values, each one representative of a corresponding attribute, for at least one instance of the work unit executed previously, and
estimating each attribute for the work unit according to the corresponding measured values.

3. The method according to claim 1, wherein the step of selecting the subset of the work units includes:
establishing a priority order for the work units, and
selecting the work units in succession according to the priority order while a predefined condition is met.

4. The method according to claim 3, wherein the predefined condition is indicative of a maximum allowable usage of at least one of the resources by the work units in execution and the selected work units.

5. The method according to claim 3, wherein the step of establishing the priority order for the work units includes:
creating a list for each resource, the list ordering the work units according to the attributes corresponding to the resource, and
alternately extracting each first work unit or each last work unit from the lists.

6. The method according to claim 1, wherein the step of selecting the subset of the work units includes:
identifying a combination of the work units optimizing the objective function.

7. A program product comprising a computer readable medium on which a program is stored, the program being directly loadable into a working memory of a data processing system for performing a method of scheduling submission of work units for execution on the data processing system when the program is run on the system, the method including the steps of:
providing a plurality of attributes for each work unit, each attribute being indicative of the usage of a corresponding resource of the system by the work unit, wherein the plurality of attributes for each work unit includes at least one of a first attribute indicative of a usage of a processing power, a second attribute indicative of a usage of a memory of the system, or a third attribute indicative of a usage of an input/output activity of the system;
selecting a subset of the work units for optimizing the usage of each resource individually according to a corresponding combination of the attributes; and
submitting the selected work units, wherein the step of selecting the subset of the work units includes:
defining an objective function indicative of a distribution of the usage of the resources of the system, wherein the step of defining the objective function includes, for each combination of the eligible work units:
calculating a total parameter for each resource by summing the attributes corresponding to the resource for each eligible work unit of the combination, and
calculating a discontinuance factor by summing the absolute value of the differences between each pair of total parameters.

8. A workload scheduler for scheduling submission of work units for execution on a data processing system, comprising:
a processor; and
a memory coupled to the processor, wherein the memory comprises instructions which, when executed by the processor, cause the processor to:
provide a plurality of attributes for each work unit, each attribute being indicative of the usage of a corresponding resource of the system by the work unit, wherein the plurality of attributes for each work unit includes at least one of a first attribute indicative of a usage of a processing power, a second attribute indicative of a usage of a memory of the system, or a third attribute indicative of a usage of an input/output activity of the system;
select a subset of the work units for optimizing the usage of each resource individually according to a corresponding combination of the attributes; and
submit the selected work units, wherein the instructions to select the subset of the work units further cause the processor to:
define an objective function indicative of a distribution of the usage of the resources of the system, wherein the instructions to define the objective function further causes the processor to, for each combination of the eligible work units:
calculate a total parameter for each resource by summing the attributes corresponding to the resource for each eligible work unit of the combination, and
calculate a discontinuance factor by summing the absolute value of the differences between each pair of total parameters.

9. An apparatus for scheduling submission of work units for execution on a data processing system, the apparatus including:

a processor; and a memory coupled to the processor, wherein the memory comprises instructions which, when executed by the processor, cause the processor to implement:

means for providing a plurality of attributes for each work unit, each attribute being indicative of the usage of a corresponding resource of the system by the work unit, wherein the plurality of attributes for each work unit includes at least one of a first attribute indicative of a usage of a processing power, a second attribute indicative of a usage of a memory of the system, or a third attribute indicative of a usage of an input/output activity of the system;

means for selecting a subset of the work units for optimizing the usage of each resource individually according to a corresponding combination of the attributes; and means for submitting the selected work units, wherein the means for selecting the subset of the work units includes:

means for defining an objective function indicative of a distribution of the usage of the resources of the system, wherein the means for defining the objective function includes, for each combination of the eligible work units:

means for calculating a total parameter for each resource by summing the attributes corresponding to the resource for each eligible work unit of the combination, and means for calculating a discontinuance factor by summing the absolute value of the differences between each pair of total parameters.

10. A structure for scheduling submission of work units for execution on a data processing system, the structure including:

a processor; and a memory coupled to the processor, wherein the memory comprises instructions which, when executed by the processor, cause the processor to implement:

a profile updating module within the data processing system, wherein the profile updating module provides a plurality of attributes for each work unit, each attribute being indicative of the usage of a corresponding resource of the system by the work unit, wherein the plurality of attributes for each work unit includes at least one of a first attribute indicative of a usage of a processing power, a second attribute indicative of a usage of a memory of the system, or a third attribute indicative of a usage of an input/output activity of the system; and an executor module within the data processing system, wherein the executor module selects a subset of the work units for optimizing the usage of each resource individually according to a corresponding combination of the attributes and wherein the executor module submits the selected work units, wherein the executor module selecting the subset of the work units includes:

the executor module defining an objective function indicative of a distribution of the usage of the resources of the system, wherein the executor module defining the objective function includes, for each combination of the eligible work units:

the executor module calculating a total parameter for each resource by summing the attributes corresponding to the resource for each eligible work unit of the combination, and the executor module calculating a discontinuance factor by summing the absolute value of the differences between each pair of total parameters.

* * * * *